United States Patent [19]
Godeau et al.

[11] Patent Number: 6,106,028
[45] Date of Patent: Aug. 22, 2000

[54] SNAP-FASTENING COUPLING FOR A FLUID DUCT, IN PARTICULAR FOR A MOTOR VEHICLE

[75] Inventors: Denis Godeau, Vielles Maisons/Joudry; Philippe Exandier, Panne, both of France

[73] Assignee: Hutchinson, Paris, France

[21] Appl. No.: 09/257,330

[22] Filed: Feb. 25, 1999

[30] Foreign Application Priority Data

Feb. 27, 1998 [FR] France ................................. 98-02392
Nov. 2, 1998 [FR] France ................................. 98-13740

[51] Int. Cl.$^7$ .................................................. F16L 39/00
[52] U.S. Cl. .......................... 285/319; 285/320; 285/308; 285/310
[58] Field of Search ................................. 285/319, 308, 285/310, 320

[56] References Cited

U.S. PATENT DOCUMENTS

| | | |
|---|---|---|
| 3,990,727 | 11/1976 | Franics . |
| 5,161,830 | 11/1992 | Minoru . |
| 5,219,188 | 6/1993 | Abe et al. ................................ 285/319 |
| 5,573,279 | 11/1996 | Rea et al. ............................... 285/319 |
| 5,653,475 | 8/1997 | Scheyhing et al. .................... 285/319 |
| 5,779,278 | 7/1998 | Grooters et al. ....................... 285/319 |

FOREIGN PATENT DOCUMENTS

| | | |
|---|---|---|
| 0 724 108 | 7/1996 | European Pat. Off. . |
| 43 10 795 | 7/1994 | Germany . |
| 2 235 267 | 2/1991 | United Kingdom . |

*Primary Examiner*—Terry Lee Melius
*Assistant Examiner*—Aaron Dunwoody
*Attorney, Agent, or Firm*—Alston & Bird LLP

[57] ABSTRACT

A snap-fastenable coupling for a fluid duct, in particular for a motor vehicle, the coupling comprising a cylindrical bushing secured to one end of a duct for coupling to a tubular endpiece which is designed to be inserted into the bushing and which has a peripheral projection in the vicinity of its free end, and a cylindrical locking member fitted around the bushing and designed to co-operate with a portion of the bushing and with the peripheral projection on the endpiece to hold the endpiece engaged in the bushing, wherein the locking member has at least one longitudinal slot and is formed with two side tabs organized on respective opposite sides of said slot to enable the locking member to be opened for disconnection of the duct from the endpiece by applying thrust in two opposite directions on the tabs. The invention applies in particular to circuits for fluids under relatively high pressure in motor vehicles.

23 Claims, 7 Drawing Sheets

SNAP-FASTENING COUPLING FOR A FLUID DUCT, IN PARTICULAR FOR A MOTOR VEHICLE

The invention relates to an improved snap-fastening coupling for a fluid duct, in particular for a motor vehicle, the coupling being intended in particular for ducts of fluid under relatively high pressure, such as ducts in an air conditioning circuit, for example.

BACKGROUND OF THE INVENTION

In general, couplings for ducts of this type comprise a metal bushing which is fixed, e.g. crimped, on the end of the duct, and which is intended to engage on a tubular endpiece of an element of the above-mentioned circuit, the bushing ensuring that the duct and the endpiece are fluid-tight. A cylindrical locking member surrounds the bushing and the endpiece and co-operates with them by hooking and/or snap-fastening to oppose separation thereof and to maintain the connection between the duct and the endpiece.

This type of coupling must be reliable, while also being as simple and as low cost as possible. It is also requested or desired that it be easy and quick to assemble and that it enable the duct and the endpiece to be disconnected by a quick movement that can be performed by one hand without a tool.

OBJECTS AND SUMMARY OF THE INVENTION

A particular object of the invention is to satisfy this need by means of a snap-fastening coupling that satisfies the above-mentioned conditions.

To this end, the invention provides a coupling comprising a cylindrical bushing secured to one end of a duct for coupling to a tubular endpiece which is designed to be inserted into the bushing and which has a peripheral projection in the vicinity of its free end, and a cylindrical locking member fitted around the bushing and designed to co-operate with a portion of the bushing and with the peripheral projection on the endpiece to hold the endpiece engaged in the bushing, wherein the locking member has at least one longitudinal slot and is formed with two side tabs organized on respective opposite sides of said slot to enable the locking member to be opened for disconnection of the duct from the endpiece by applying thrust in two opposite directions on the tabs.

The longitudinal slot of the locking member makes it possible firstly to mount it easily on the bushing or on the endpiece, and secondly to open it by means of one hand only when it is desired to disconnect the duct from the endpiece.

In an embodiment, the above-mentioned side tabs are formed at one end of the locking member and are adjacent to each other.

In another embodiment of the invention, the locking member comprises two diametrically-opposite longitudinal slots and the two above-mentioned side tabs are diametrically opposite and situated on respective sides of an axial plane including both slots.

In both cases, it suffices to use two fingers to apply torque on the two side tabs to open the locking member and enable the duct and the endpiece to be disconnected.

The locking member can be made as a single piece, or it can be made as two semicylindrical pieces which are mutually engaged and fitted together and/or on the above-mentioned bushing by elastic clamping or by snap-fastening.

The locking member can be made of plastics material or of metal.

It is preferably mounted on the bushing and co-operates with the endpiece by snap-fastening.

In general, the portion of the bushing with which the locking member co-operates is constituted by at least one shoulder or peripheral setback of the bushing in a first embodiment of the coupling, or by at least one projection situated at the periphery of the bushing and towards its end which is adjacent to the tubular endpiece in a second embodiment of the invention.

This second embodiment presents the advantage of avoiding the sharp angle that is required for making the shoulder in the bushing, and it makes it possible to reduce the axial length of the locking member.

BRIEF DESCRIPTION OF THE DRAWINGS

The invention will be better understood and other characteristics, details, and advantages thereof will appear more clearly on reading the following description, given by way of example and made with reference to the accompanying drawings, in which.

MORE DETAILED DESCRIPTION

Figure 1:
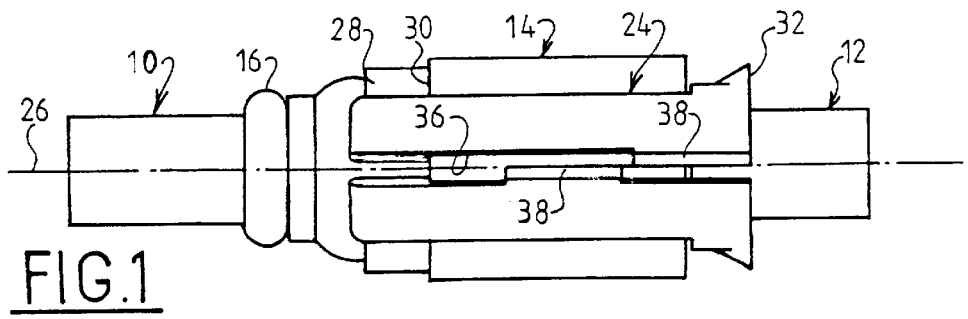
FIGS. 1 and 2 are a side view and a plan view respectively of a coupling constituting a first embodiment of the invention.
Figure 2:
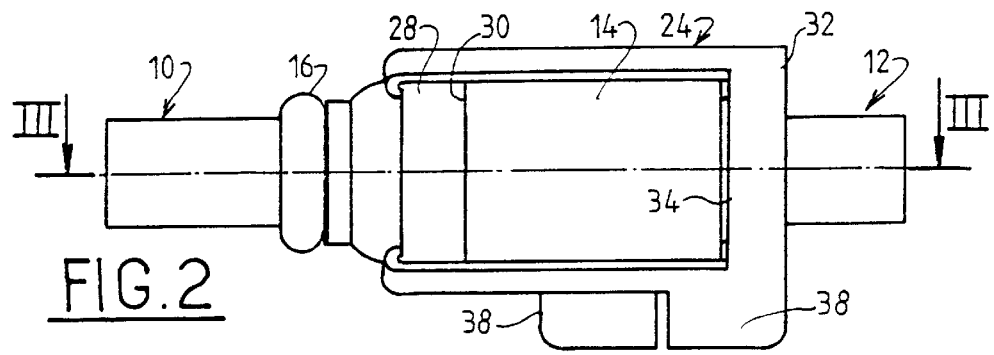

Reference is made initially to FIGS. 1 to 4 which show a first embodiment of a coupling of the invention for connecting a duct 10 to a tubular endpiece 12, both of which are constituted by rigid tubes, e.g. made of metal, for the purpose of conveying fluid circulating at relatively high pressure, e.g. in an air conditioning circuit for a motor vehicle.

The coupling of the invention comprises a generally cylindrical metal bushing 14 which is crimped to the end of the duct 10, the bushing being formed with an outwardly projecting bead 16 which serves as a thrust and positioning abutment for one end of the bushing 14.

The other end of the bushing 14 extends beyond the end of the duct 10 and includes a sealing gasket 18 molded onto its inside face.

Figure 3:
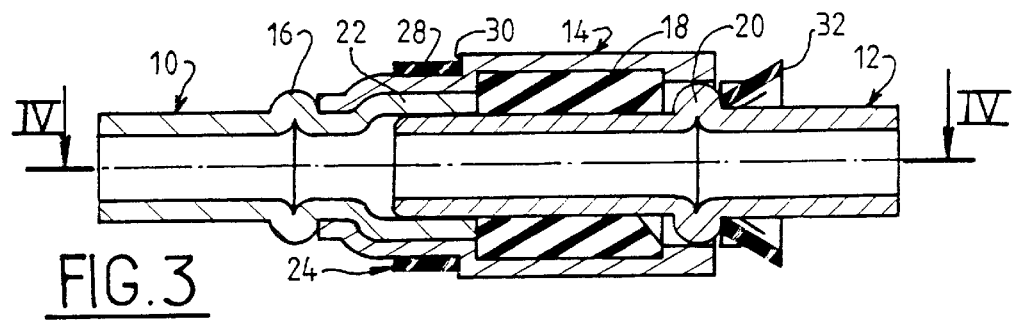
FIG. 3 is an axial section view on line III—III of FIG. 2.
Figure 4:
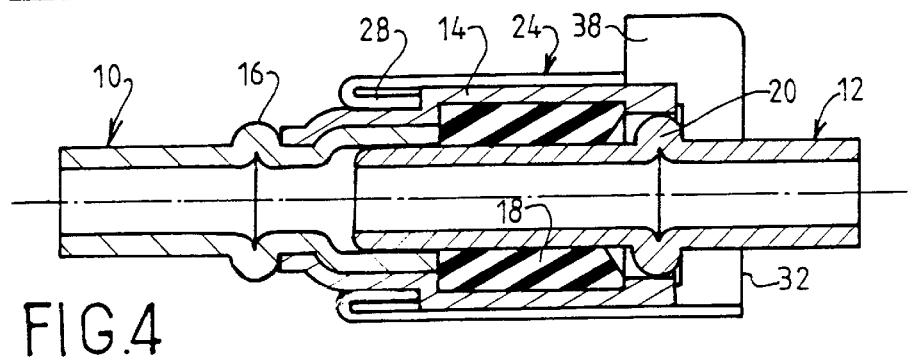
FIG. 4 is an axial section view on line IV—IV of FIG. 3.

The endpiece 12 has an outwardly-projecting bead 20 whose outside diameter is slightly smaller than the inside diameter of the free end of the bushing 14 in the embodiment shown, the bead 20 being at a certain distance from the free end of the endpiece 12 so that said free end can be inserted not only inside the bushing 14 but also inside the enlarged free end 22 of the duct 10 as shown in FIGS. 3 and 4 when the bead 20 is inside the bushing 14.

In this position, fluid tightness is provided by the gasket 18 of the bushing 14 which presses against the peripheral outer surface of the endpiece 12, with the cylindrical inner surface of the gasket 18 optionally being formed in conventional manner to have annular sealing ribs or lips that form a plurality of successive lines of sealing on the end of the endpiece 12.

In the connected position as shown in FIGS. 3 and 4, the endpiece 12 is guided by the enlarged portion 22 of the duct 10 and by the free end of the bushing 14 in which the peripheral bead 20 of the endpiece 12 is received, thus preventing any transverse movement of the endpiece 12 inside the bushing 14 and the duct 10.

The coupling of the invention also comprises a locking member 24 which surrounds the bushing 14 and the endpiece 12, and which is mounted on the bushing 14 with a small amount of clearance in translation in the axial direction and in rotation about their common longitudinal axis 26, one end 28 of the member 24 bearing against a peripheral abutment 30 of the bushing 14 in the direction that prevents the member 24 from moving towards the endpiece 12, the other end 32 of the locking member 24 being shaped so as to engage by resilient snap-fastening behind the peripheral bead 20 of the endpiece 12, as shown in FIG. 3.

This end 32 is of cylindrical annular shape and its inside peripheral edge 34 extends radially towards the axis 26 at at least two diametrically-opposite points on its periphery so as to form resilient snap-fastening tabs which are radially deformable outwards by the bead 20 when the endpiece 12 is inserted into the bushing 14 and the duct 10, and which returns to their initial locking positions in abutment against the bead 20 as soon as it is engaged in the bushing 14 and has released said tabs.

In this position (as shown in FIG. 3), the connection between the duct 10 and the endpiece 12 is held in positive manner by the locking member 24. This member has at least one and preferably two diametrically-opposite longitudinal slots 36 which extend over the major portion of its length between its end 32 projecting beyond the bushing 14 and the vicinity of its opposite end 28, one of the two slots possibly extending over the entire length of the locking member 34 so as to enable it to be opened by elastic deformation, thereby facilitating assembly thereof on the bushing 14.

Two side tabs 38 are formed on the locking member 24 on either side of said longitudinal slot 36 in the vicinity of the end 32. These side tabs extend radially relatively to the longitudinal axis of the member 24 and they are offset from each other along said axis while remaining adjacent or substantially adjacent.

Figure 6:
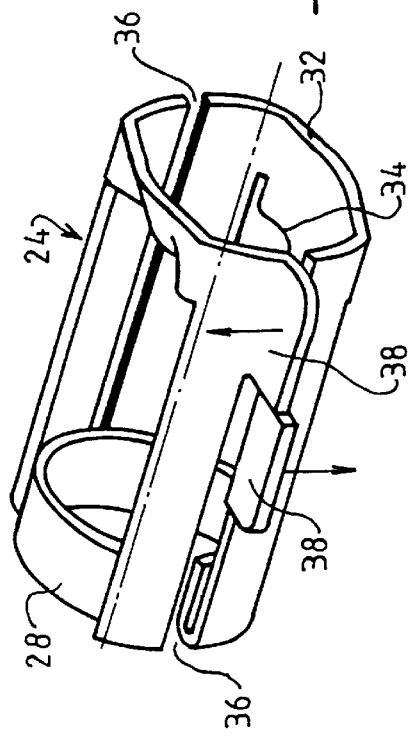
FIG. 6 is a diagrammatic perspective view of the locking member of the couplings shown in FIGS. 1 to 5.

By pushing on the two tabs 38 in two opposite directions, as shown by arrows in FIG. 6, which can be done with the forefinger and thumb and without using a special tool, it is possible to open the end 32 of the locking member 24 sufficiently to disengage the snap-fastening tabs 34 from the bead 20 on the endpiece 12 and thus disconnect the duct 10 from the endpiece.

Figure 5:
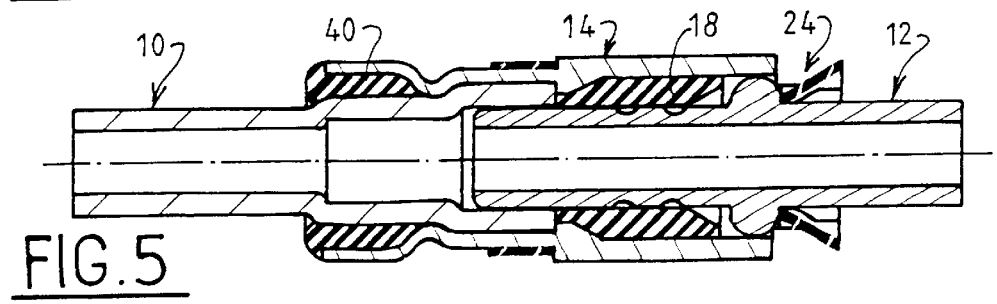
FIG. 5 is an axial section view of a variant of the first embodiment of the coupling of the invention.

In the variant shown in axial section in FIG. 5, the locking member 24 is identical to that of FIGS. 1 to 4 and 6, while the bushing 14 differs from that shown in FIGS. 1 to 4 in that it has a sealing gasket 40 molded onto the inside of its end surrounding the duct 10. This provides two seals, one between the bushing 14 of the duct 10, and the other between the bushing 14 and the endpiece 12.

The two side tabs 38 lie substantially in the same plane in the embodiment of FIGS. 1 to 6. In a variant, they could lie in different planes. Under such circumstances, the member 24 could be unlocked either by moving the two tabs 38 towards each other, or on the contrary by pushing them apart.

Figure 7:
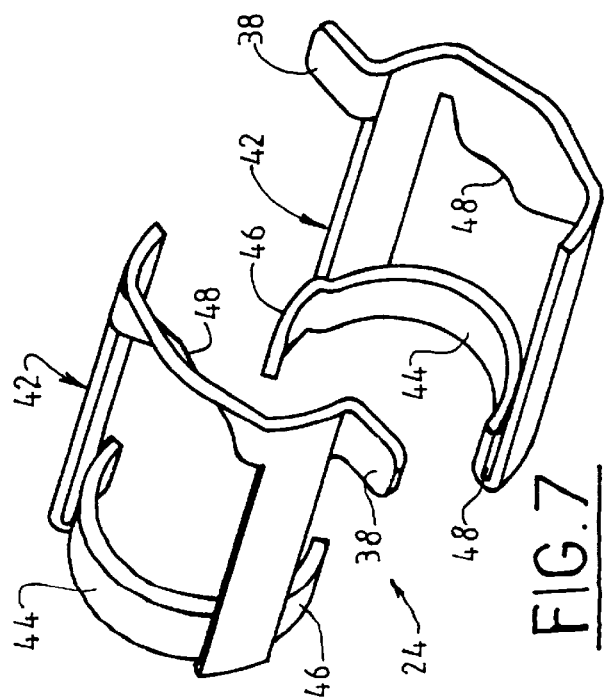

The locking member 24 which is made as a single piece in the embodiment shown in FIGS. 1 to 6 could be made as two semicylindrical pieces 42 as shown diagrammatically in FIG. 7.

The two pieces 42 are preferably identical and have means enabling them to be fixed to each other by folded seams or by resilient snap-fastening.

To this end, the semi-annular end 44 of each piece 42 situated at the duct end is extended by a tab 46 on one side and has a housing 48 on the other side for receiving the tab 44 from the other piece 42. The end of each piece 42 situated at the endpiece end is semi-annular in shape and has an inside edge 48 extending inwards to form a snap-fastening tab against the bead 20 of the endpiece 12.

On assembly, it suffices to place the two pieces 42 on either side of the bushing 14 and to insert the tabs 46 into the corresponding housings 48, thus connecting together the two pieces 42 and forming the locking member 24.

Each piece 42 is formed with a side tab 38 of the above-specified type, such that in the assembled state the locking member 24 has two side tabs 38 which are diametrically opposite. It is still possible with finger and thumb to exert torque on the two tabs 38 to open said end of the locking member 24 and thus enable the duct 10 to be disconnected from the endpiece 12.

Figure 8:
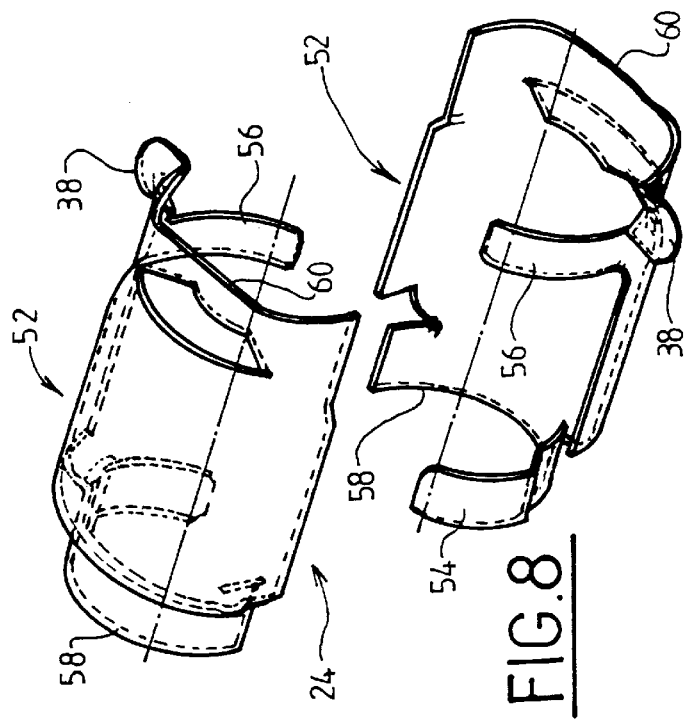
FIGS. 7 and 8 are diagrammatic perspective views of two variant embodiments of said locking member.

In the variant embodiment shown in FIG. 8, the locking member 24 is made of two identical pieces 52 having the same characteristics as the pieces 42 of FIG. 7, and each being semicylindrical in shape over its entire length, but with no openings between their ends.

In addition, resilient snap-fastening or fixing tabs 54 and 56 are formed at respective ends 58 and 60 of the pieces 52, each of which also has a side tab 38 of the above-specified type at its end 62 situated adjacent to the endpiece 12.

Figure 9:
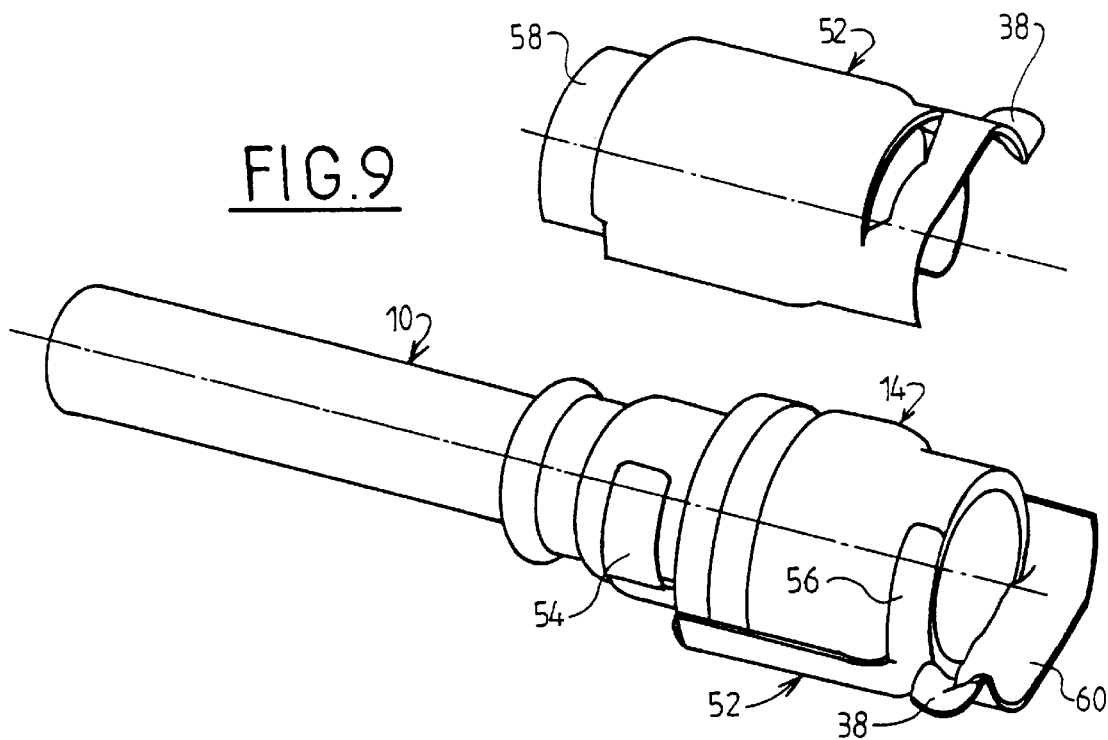
FIG. 9 is a diagrammatic perspective view showing a portion of the FIG. 8 locking member mounted in place on a coupling.
Figure 10:
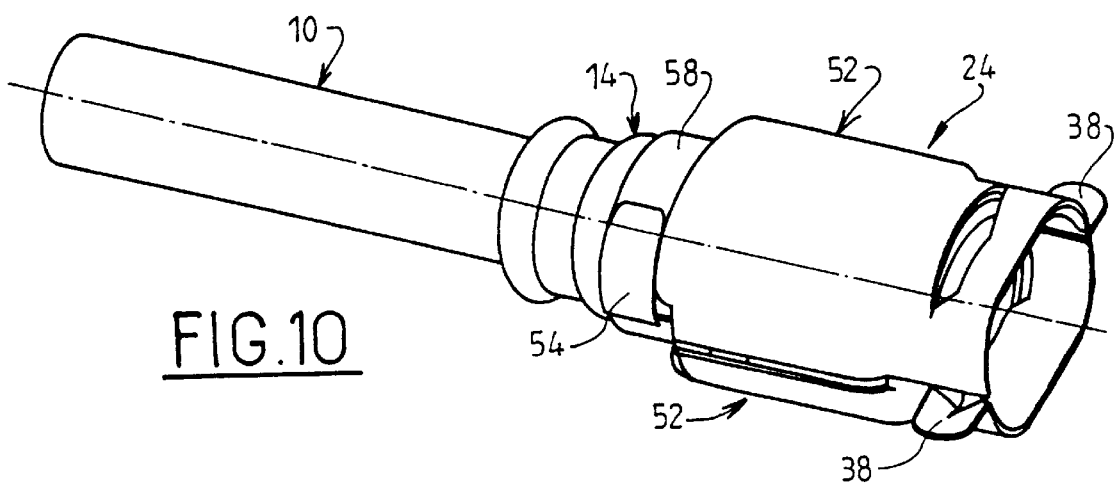
FIG. 10 is a diagrammatic perspective view showing the two portions of the FIG. 8 locking member mounted in place on a coupling.

The pieces 52 are mounted on a bushing 14 in the manner shown diagrammatically in FIGS. 9 and 10.

In FIG. 9, a (bottom) piece 52 has been mounted on the bushing 14 already crimped on the end of the duct 10, while the (top) other piece 52 is positioned above the bushing 14, ready to be mounted on the bushing and on the bottom piece 52.

The (rear) tab 54 of the bottom piece 52 surrounds a (rear) cylindrical portion of the bushing 14 with a small amount of clearance, while the other fixing tab 56 of said bottom portion 52 is pressed resiliently against a cylindrical portion of the (front) other end of the bushing 14.

When the top piece 52 is placed on the bushing 14 as shown in FIG. 10, its front end 60 covers the fixing tab 56 of the bottom piece 52, while the rear end 58 of the top piece 52 is engaged between the bushing 14 and the fixing tab 54 of the bottom piece 52, and it is held by said resilient tab 54.

In the position of FIG. 10, the locking member 44 is mounted and fixed on the bushing 14 and is ready to lock by snap-fastening onto an endpiece 12 inserted into the bushing 14 and into the end of the duct 10.

As before, torque exerted by means of the finger and thumb on the side tabs 38 enables the front end of the locking member 24 to be opened to disconnect the duct 10 from the endpiece 12.

A particularly important advantage of the coupling of the invention is that the locking member 24 is not prevented from rotating on the bushing 14 and the endpiece 12 and can be moved at will into the most appropriate angular position about its longitudinal axis for being operated.

The locking member 24 can be made out of any suitable material, in particular a plastics material or metal. Although it is mounted on the bushing 14 in the preferred embodiment of the invention, it could equally well be mounted on the endpiece 12 so as to be locked by resilient snap-fastening on the bushing 14.

Reference is now made to FIGS. 11 to 16 which show a second embodiment of a coupling of the invention. Compared with the first embodiment, the coupling has improvements concerning the bushing 114, the sealing device 118, and the locking member 124.

In general, the locking member 124 is fitted to the bushing 114 by resilient deformation of said member 124, and assembly means are provided between the bushing 114 and the locking member 124 to secure the locking member on the bushing 114.

Figure 11:
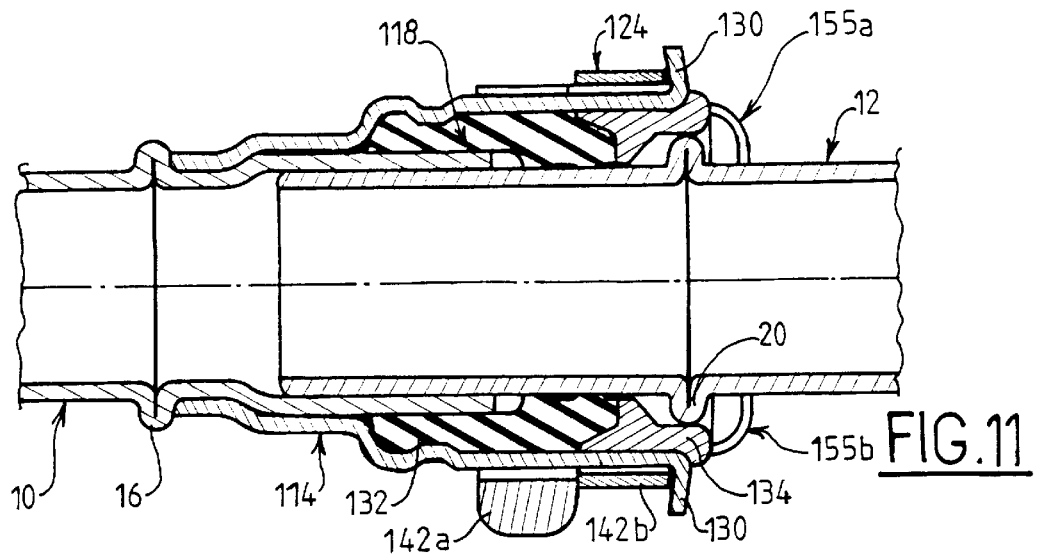
FIG. 11 is an axial section view of a second embodiment of a coupling of the invention.

The metal bushing 114 is still generally cylindrical in shape and it is crimped to the end of the duct 10, the bead 16 on the duct 10 serving as a thrust and positioning abutment for the bushing 114 (FIG. 11).

Figure 12:
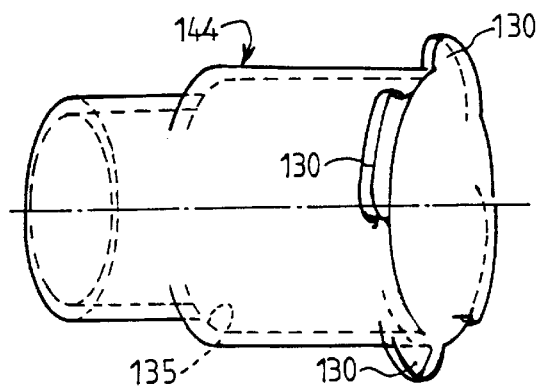
FIG. 12 is a perspective view of the bushing of the FIG. 11 coupling.
Figure 13:
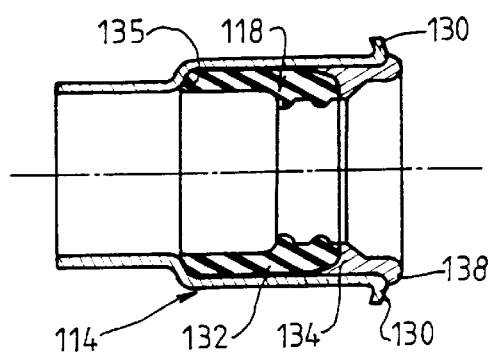
FIG. 13 is an axial section view of the subassembly comprising the bushing and the sealing device of the FIG. 11 coupling.

In contrast, towards the free end of the bushing 114 which extends beyond the end of the duct 10, there is provided at least one projection 130 from the peripheral surface of the bushing 114 that is intended to co-operate with the locking member 124, in a manner explained below. The bushing 114 has four projections 130 which are diametrically opposite in pairs (FIG. 12).

The sealing device 118 (FIGS. 11 and 13) is constituted by a cylindrical gasket 132 extended axially at one end by a cylindrical protection insert 134. The gasket 132 is advantageously secured to the insert 134 so as to form a single piece therewith. This bond can be provided by adhesive or by mechanical fastening means of complementary shapes.

The gasket 132 is made of an elastomer material, while the protection insert 134 can be made of metal or plastics material. The sealing device 118 is received in the bushing 114 by initially inserting the gasket 132. The bushing 114 has a reduction in its diameter so as to define an internal annular shoulder 135 forming an abutment for the gasket 132. The free end of the protection insert 134 has an external rim 138 which presses against the end surface of the bushing 114 when the gasket 132 is pressed against the shoulder 135. Thereafter, the bushing 114 is crimped onto the duct 10, as in the first embodiment, prior to being mounted on the endpiece 12.

It is important to observe that crimping makes it possible in a single operation to fix the bushing 114 on the duct 10, to secure the gasket 132 axially, and to provide sealing between the bushing 114 and the duct 10.

Figure 14:
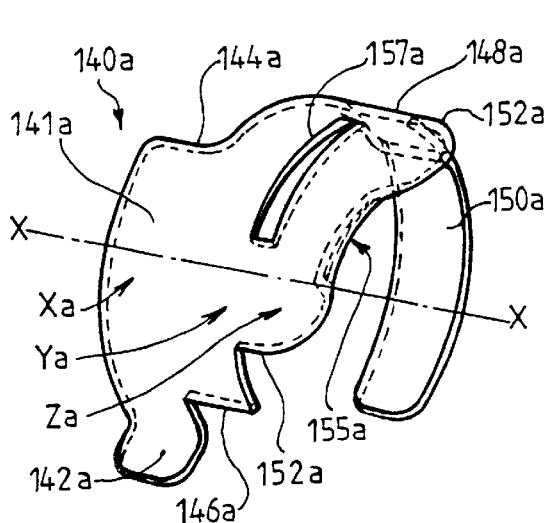
FIGS. 14 and 15 are perspective views of two pieces forming the locking member of the FIG. 11 coupling.
Figure 15:
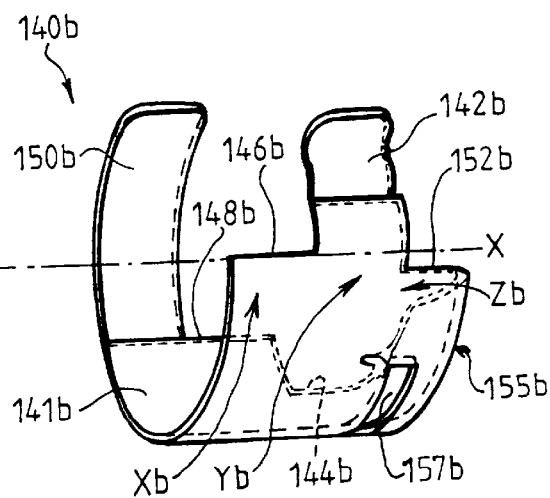

The locking member 124 is made of two pieces 140*a* and 140*b* which are shown in FIGS. 14 and 15 respectively.

The first piece 140*a* is generally semicylindrical in shape about an axis X—X and has a curved wall 141*a* that can be considered as comprising three zones:

an end transverse zone Xa which extends between a side tab 142*a* folded outwards and a longitudinal side edge 144*a*;

a central transverse zone Ya which extends between a longitudinal side edge 146*a* and a longitudinal side edge 148*a*; a curved tongue 150*a* extending the central zone Ya from the middle of the longitudinal side 148*a*; and an end transverse zone Za which extends between two longitudinal side edges 152*a*.

The free end of the end transverse zone Za is folded inwards between the two longitudinal side edges 152*a* to form a resilient snap-fastening tab 155*a*.

An opening 157*a* is made through the curved wall 141*a* at a position situated between its central zone Ya and its end zone Za, said opening 157*a* being complementary in shape to the projections 130 from the bushing 114. The opening 157*a* of the first piece 140*a* is situated substantially at 90° relative to the side tab 142*a*, and the resilient snap-fastening tab 155*a* is situated at substantially the same level as the opening 157*a*.

In this way, the opening 157*a* of the locking member 124 and a projection 130 of the bushing 114 constitute assembly means having complementary shapes to secure the locking member 124 on the bushing 114.

The second piece 140*b* of the locking member 124 is generally similar in overall shape to the first piece 140*a*, and the same reference numerals are retained, with a being replaced by b. Nevertheless, a difference lies in the fact that the positions of the side tab 142*b* and the tongue 150*b* are inverted, i.e.:

the side tab 142*b* for pressing against is situated in the central transverse zone Yb; and the tongue 150*b* is situated in the end transverse zone Xb.

The locking member 124 is put into place by elastic deformation around the bushing 114.

The first piece 140*a* is positioned on the bushing 114 in such a manner that one of the four projections 130 of the bushing 114 is engaged in the opening 157*a* of the first piece 140*a*. In this manner, the first piece 140*a* is prevented from moving axially or in rotation.

The second piece 140*b* is then positioned in such a manner that the projection 130 from the bushing 114 which is remote from the projection already engaged in the opening 157*a* of the first piece 140*a* is itself engaged in the opening 157b of the second piece 140b, given that, once this positioning has been achieved:

the two pieces 140a and 140b are diametrically opposite each other and together they surround the bushing 114;

the two resilient snap-fastening tabs 155a and 155b define between them two diametrically-opposite notches 158 in which the third and fourth projections 130 from the bushing 114 are engaged;

the zones Xa, Ya, and Za of the wall 142a of the piece 140a respectively face the zones Xb, Yb, and Zb of the wall 142b of the piece 140b;

the two side tabs 142a and 142b are situated substantially in the same plane with a slot 136 between them;

the side tab 142a of the piece 140a covers the longitudinal side edge 146b of the piece 140b, and conversely, the side tab 142b of the piece 140b covers the longitudinal side edge 146a of the piece 140a; and the free end of the tongue 150a of the piece 140a faces the longitudinal side edge 144b of the piece 140a, and conversely, the free end of the tongue 150b of the piece 140b faces the longitudinal side edge 144a of the piece 140a.

Figure 16:
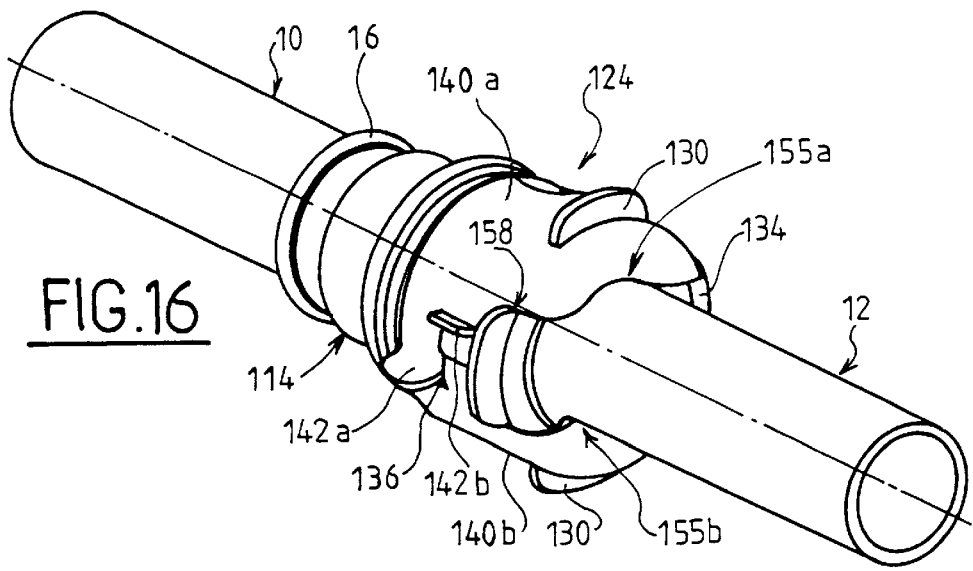
FIG. 16 is a perspective view of the FIG. 11 coupling.

Once the coupling has been mounted on the duct 10, the endpiece 12 can be engaged in the bushing 114 until the two tabs 155a and 155b engage by resilient snap-fastening behind the peripheral bead 20 on the endpiece 12, as shown in FIGS. 11 and 16.

In a variant of this second embodiment, the locking member 124 is constituted as a single piece having at least one longitudinal slot to enable the locking member 124 to deform elastically while it is being mounted on the bushing 114 and also while the endpiece 12 is being inserted.

Figure 17:
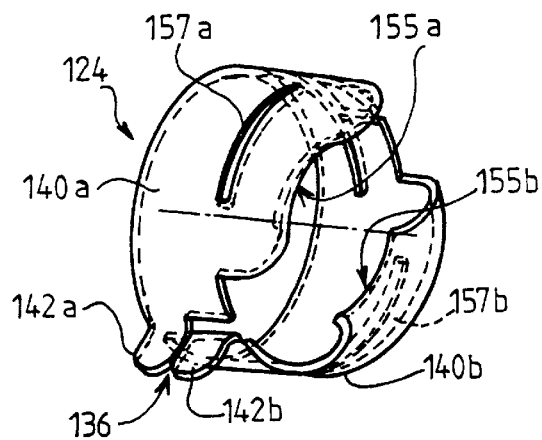
FIGS. 17 and 18 are respective views of a one-piece variant of the coupling member of FIGS. 14 and 15.
Figure 18:
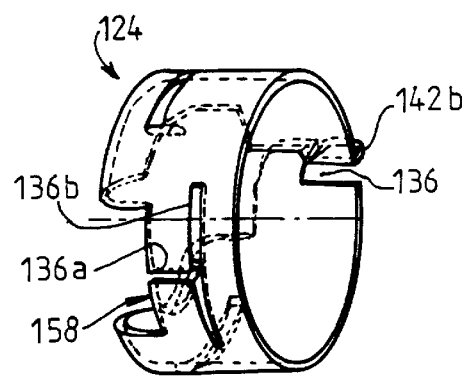

A one-piece locking member 124 of generally cylindrical shape is shown in FIGS. 17 and 18. Compared with FIGS. 14 and 15, the two walls 141a and 141b are now united and form a longitudinal slot 136 level with the side tabs 142a and 142b. The locking member 124 has two diametrically-opposite transverse openings 157a and 157b which are designed to receive two projections 130 on the bushing 114. The two openings 157a and 157b are situated at substantially 90° relative to the side tabs 142a and 142b, as in the example shown in FIGS. 14 and 15. Towards one end, the locking member 124 also has two diametrically-opposite resilient snap-fastening tabs 155a and 155b for co-operating with the peripheral bead 20 on the endpiece 12. The two tabs 155a and 155b are situated at substantially the same level as the openings 157a and 157b. Remote from the side tabs 142a and 142b, it is advantageous to provide at least one longitudinal slot 136a which opens out into a transverse slot 136b so as to increase the resilience of the locking member 124 (FIG. 18). The slot 136a is diametrically opposite the side tabs 142a and 142b, and advantageously receives a projection 130 from the bushing 114 to prevent the locking member 124 from moving and to make it easier to open.

When the bushing 114 has four projections 130 regularly distributed around its periphery, two diametrically-opposite projections 130 are designed to be received in the two openings 157a and 157b, a third projection 130 is designed to be received in the slot 136, and the fourth projection 130 is designed to be received in a notch 158 defined between the two resilient snap-fastening tabs 155a and 155b on the side remote from the two side tabs 142a and 142b.

Figure 19:
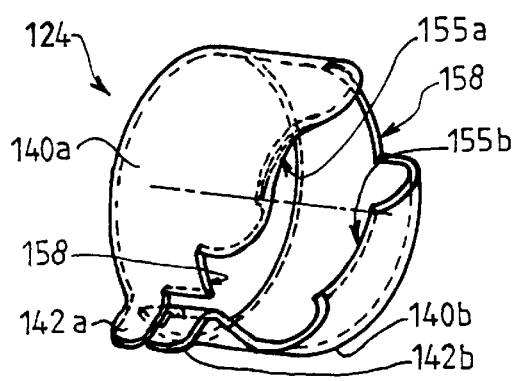
FIGS. 19 and 20 are perspective views of another one-piece variant of the locking member of FIGS. 14 and 15.
Figure 20:
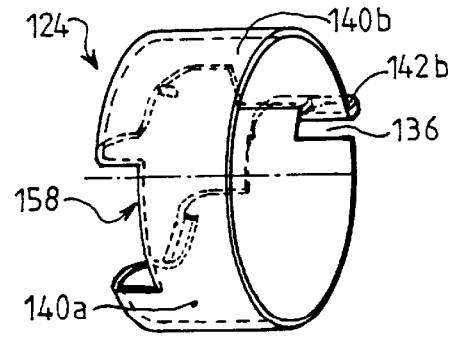
Figure 21:
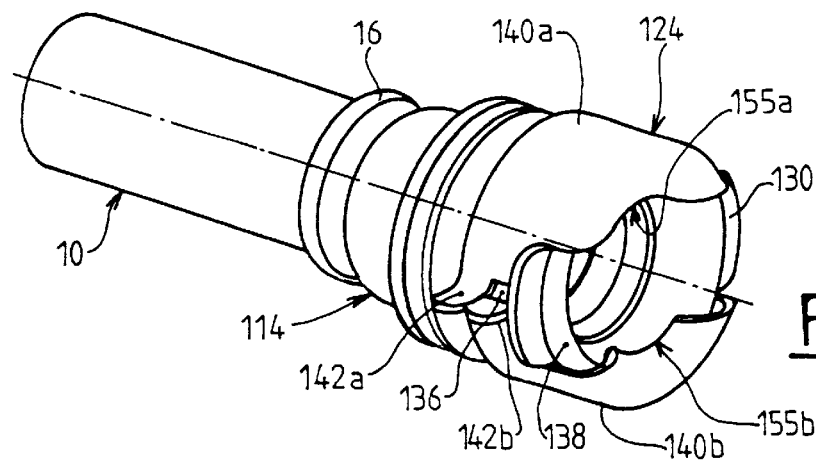
FIG. 21 is a fragmentary perspective view of the FIG. 11 coupling including the locking member of FIGS. 19 and 20.

The locking member shown in FIGS. 19 and 20 is likewise made as a single piece, but it is designed to co-operate with a bushing 114 that has only two diametrically-opposite peripheral projections 130. In this case, the walls 141a and 141b of the locking member 124 do not have the openings 157a and 157b. The two projections 130 are positioned between the notches 158 that are defined between the two resilient snap-fastening tabs 155a and 155b, as shown in FIG. 21.

Above, the two tabs of the locking member 124 have been designed to be manipulated by hand so as to be moved apart in two opposite directions for the purpose of releasing the endpiece 12. For this purpose, the tabs are folded through substantially 90° in order to make them easier to manipulate.

Figure 22:
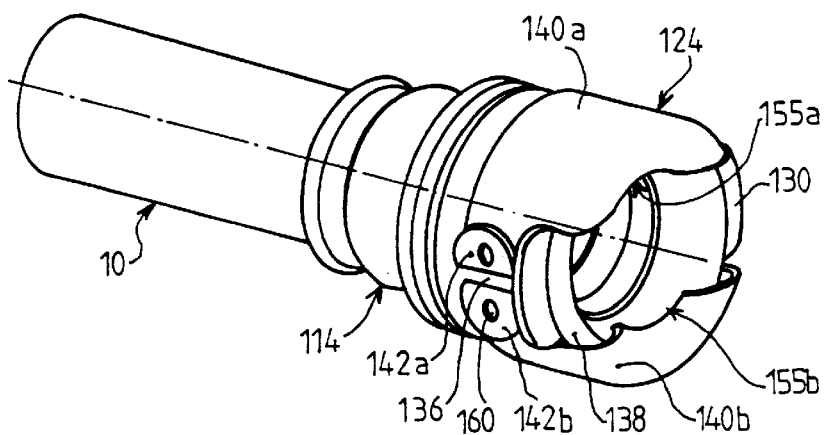
FIG. 22 is a fragmentary perspective view of the FIG. 11 coupling with another variant of the locking member of FIGS. 18 and 19.

In a variant, the tabs could equally well be manipulated by means of a tool of the pliers type for manipulating circlip securing rings. An example is shown in FIG. 22, where the two side tabs 142a and 142b are folded through 180° and each of them has a central hole 160 into which a respective limb of the pliers can be engaged.

Starting from the second above-described embodiment, variants can be envisaged concerning various pieces of the coupling.

Figure 23:
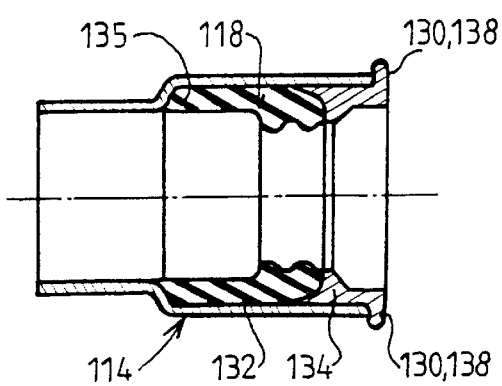
FIGS. 23 and 24 are fragmentary diagrams of possible variants of the bushing of the FIG. 11 coupling.

The projections 130 provided on the bushing 114 can be made on the tubular insert 134 of the sealing device 118. For that purpose, it suffices to organize the external rim 138 of the rim 134 in corresponding manner, as shown diagrammatically in FIG. 23.

Figure 24:
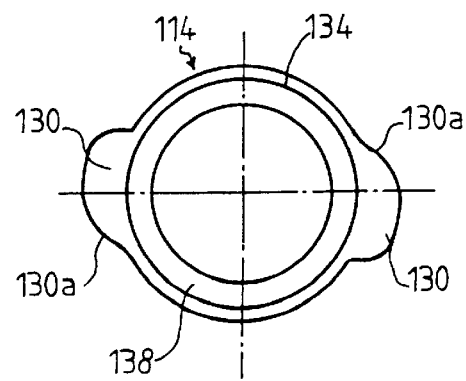

In general, the projections 130 on the bushing 114 or the insert 134 associated with the gasket 132 are made in the form of a rim which has two opposite side edges forming a sharp angle with the peripheral surface of the bushing 114. Such an angle can be provided by giving one of the side edges of the projection 130 the shape of a ramp so as to make it easier to open the coupling. An example is shown diagrammatically in FIG. 24 for the bushing 114 having two projections 130, it being understood that the two ramps 130a are symmetrical to each other about a point situated on the axis of the bushing 114.

Figure 25:
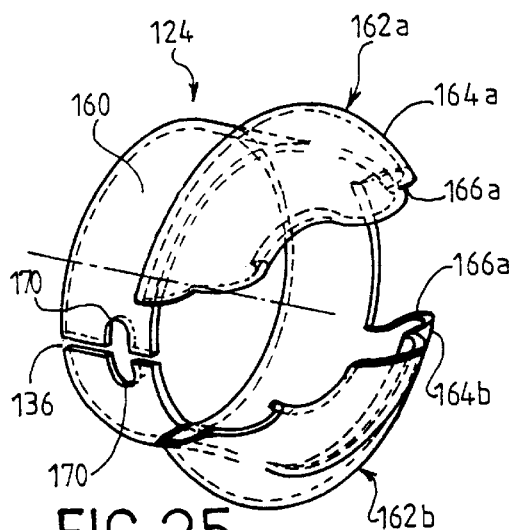
FIG. 25 is a perspective view for showing another embodiment of the locking member.
Figure 26:
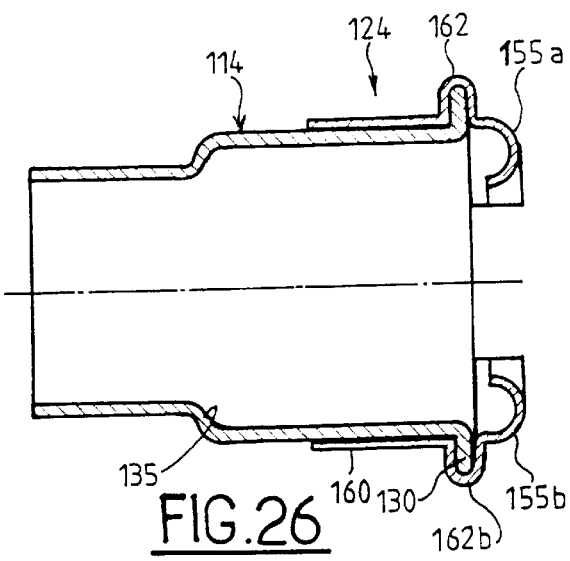
FIG. 26 is an axial section view of the bushing and of the FIG. 25 locking member once said two elements have been assembled together.

FIGS. 25 and 26 show another one-piece embodiment for the locking member 124 having different assembly means for holding the locking member 124 on the bushing 114.

The locking member 124 has a cylindrical portion 160 with a longitudinal slot 136 to enable it to deform elastically. The cylindrical portion extends axially and on one side in the form of two diametrically-opposite end portions 162a and 162b.

Each end portion 162a, 162b forms a semicircular bead 164a, 164b which extends radially outwards defining a semicircular internal groove 166a, 166b, and is then folded back inwards to form a snap-fastening tab 155a, 155b as in the preceding embodiments.

On assembly of the locking member 124 about the bushing 114, the projection 130 of the bushing 114 as formed by a collar at the end thereof is received in the grooves 166a, 166b of the locking member 124 so as to hold it in place.

It will be observed that the two tabs 142a and 142b of the locking member 124 are defined by two notches 170 situated on either side of the slot 136.

Figure 27:
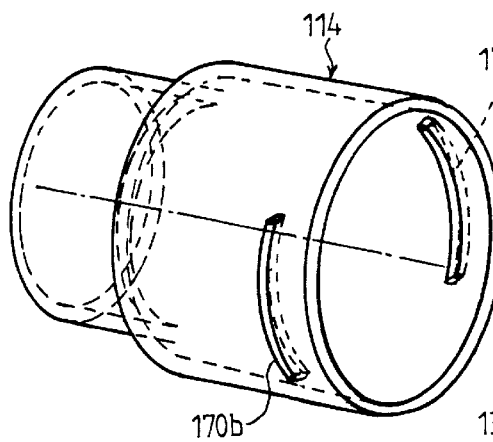
FIGS. 27 and 28 are perspective views for showing yet another embodiment of the bushing and of the locking member, respectively.
Figure 28:
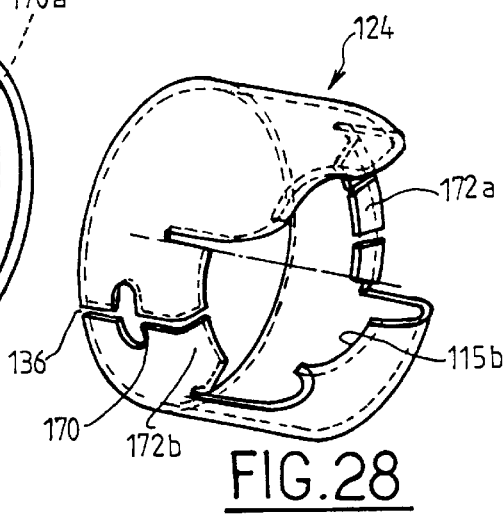
Figure 29:
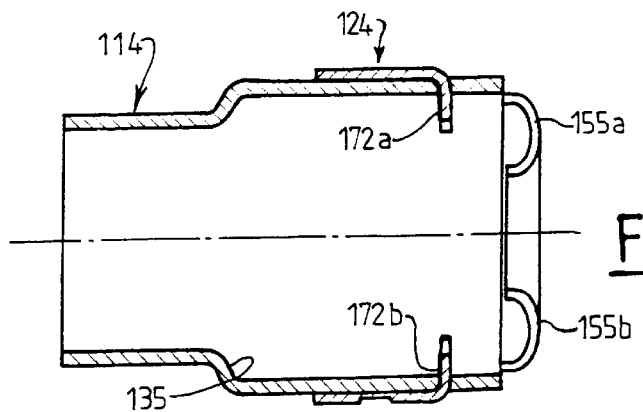
FIG. 29 is an axial section view of the bushing and of the locking member of FIGS. 27 and 28, once said two elements have been assembled together.

FIGS. 27 to 29 show a final one-piece embodiment of the locking member 124 in which the assembly means are of inverse structure, i.e. the projections 130 are provided on the locking member 124 while the corresponding openings are provided in the bushing 114.

More precisely, the bushing 114 has, for example, two diametrically-opposite openings 170a, 170b (FIG. 27), and the locking member 124 has tabs 172a, 172b that are folded inwards and formed at the free ends of the locking member 124 which are situated between the two snap-fastening tabs 155a and 155b (FIG. 28) to engage in the openings 170a, 170b of the bushing 114 (FIG. 29).

What is claimed is:

1. A snap-fastenable coupling for a fluid duct, in particular for a motor vehicle, the coupling comprising a cylindrical bushing secured to one end of a duct for coupling to a tubular endpiece which is designed to be inserted into the bushing and which has a peripheral projection in the vicinity of its free end, and a cylindrical locking member fitted around the bushing and designed to co-operate with a portion of the bushing and with the peripheral projection on the endpiece to hold the endpiece engaged in the bushing, wherein the locking member has at least one longitudinal slot and is formed with two side tabs organized on respective opposite sides of said slot to enable the locking member to be opened for disconnection of the duct from the endpiece by applying thrust in two opposite directions on the tabs.

2. A device according to claim 1, wherein the side tabs are formed in the vicinity of one end of the locking member.

3. A device according to claim 1, wherein the side tabs are adjacent to each other.

4. A device according to claim 1, wherein the locking member is in a single piece.

5. A device according to claim 1, wherein the locking member is made of two semi-cylindrical pieces fixed to each other or onto said bushing by elastic clamping or by snap-fastening.

6. A device according to claim 5, wherein the two semi-cylindrical pieces are identical to each other.

7. A device according to claim 6, wherein each semi-cylindrical piece has two tabs for resiliently mounting on the bushing or the endpiece and on the other semicylindrical piece, respectively.

8. A device according to claim 1, wherein the locking member comprises, at one of its ends, a cylindrical portion whose inside edge extends radially towards the axis of the locking member at least at two points on its periphery, to form locking tabs.

9. A device according to claim 1, wherein the locking member is mounted on the bushing and co-operates by resilient snap-fastening with the radial projection of the endpiece.

10. A device according to claim 1, wherein the locking member is made of plastic material or of metal.

11. A device according to claim 1, wherein the bushing includes a portion which co-operates with the locking member is constituted by assembly means of complementary shapes to hold the locking member on the bushing.

12. A device according to claim 11, wherein the assembly means comprise at least one projection towards the free end of the bushing, and wherein the locking member has at least one opening or notch into which said at least one projection of the bushing is engaged.

13. A device according to claim 12, wherein the locking member comprises two pieces fitted around the bushing, each piece having at least one opening in which a peripheral projection of the bushing is to be engaged.

14. A device according to claim 13, wherein each of the two pieces of the locking member comprises a snap-fastening tab designed to snap-fasten resiliently on the peripheral projection of the endpiece, the two snap-fastening tabs being diametrically opposite.

15. A device according to claim 12, wherein the locking member is formed as a single piece that is generally cylindrical in shape and has a longitudinal slot with two side tabs on either side of the slot, and towards one end has two diametrically-opposite snap-fastening tabs designed to snap-fasten resiliently on the peripheral projection of the endpiece.

16. A device according to claim 15, wherein the locking member has at least one opening in which a peripheral projection of the bushing is to be engaged.

17. A device according to claim 16, wherein the bushing has four projections regularly distributed around its periphery, wherein the locking member has two diametrically-opposite openings in which two of said peripheral projections of the busing are engaged, and wherein the two snap-fastening tabs define between them two notches in which the other two of said peripheral projections of the bushing are engaged.

18. A device according to claim 16, wherein the bushing has four projections regularly spaced apart on its periphery, wherein the locking member has two diametrically-opposite openings in which two of said peripheral projections of the bushing are engaged, a third opening in which a third peripheral projection is engaged, and wherein the two snap-fastening tabs define between them a notch in which the fourth peripheral projection of the bushing is engaged.

19. A device according to claim 16, wherein the bushing has two diametrically-opposite projections, and wherein the two snap-fastening tabs define between them two diametrically-opposite notches in which the two projections of the bushing are engaged.

20. A device according to claim 15, wherein the locking member comprises a cylindrical portion with a longitudinal slot, wherein the cylindrical portion extends axially and from one side in the form of two diametrically-opposite end portions, wherein each end portion forms a semicircular bead which extends radially outwards defining a semicircular internal groove and is folded inwards to form a snap-fastening tab, and wherein the bushing has a projection in the form of a collar designed to engage in said grooves.

21. A device according to claim 11, wherein the assembly means comprise at least one projection formed by an inwardly-folded tab of the locking member and at least one opening of the bushing.

22. A device according to claim 11, comprising a sealing device housed inside the bushing, said device comprising at least one cylindrical sealing gasket fixed on the duct by crimping.

23. A device according to claim 22, wherein the sealing gasket is extended axially by a cylindrical protection insert.

* * * * *